United States Patent
Biemer et al.

(10) Patent No.: US 10,475,128 B2
(45) Date of Patent: Nov. 12, 2019

(54) RISK UNIT BASED POLICIES

(71) Applicant: Allstate Insurance Company, Northbrook, IL (US)

(72) Inventors: Edward A. Biemer, Eastbourne (GB); Grady Irey, Des Plaines, IL (US); Caryl M. Styrsky, Wheeling, IL (US)

(73) Assignee: Arity International Limited, Belfast (IE)

( * ) Notice: Subject to any disclaimer, the term of this patent is extended or adjusted under 35 U.S.C. 154(b) by 561 days.

(21) Appl. No.: 15/170,000

(22) Filed: Jun. 1, 2016

(65) Prior Publication Data

US 2016/0275623 A1 Sep. 22, 2016

Related U.S. Application Data

(62) Division of application No. 14/607,662, filed on Jan. 28, 2015, now Pat. No. 9,390,452.

(51) Int. Cl.
*G06Q 40/08* (2012.01)
*G06Q 40/02* (2012.01)
(Continued)

(52) U.S. Cl.
CPC ............. *G06Q 40/08* (2013.01); *B60W 10/04* (2013.01); *B60W 10/30* (2013.01);
(Continued)

(58) Field of Classification Search
USPC .......................................................... 705/4
See application file for complete search history.

(56) References Cited

U.S. PATENT DOCUMENTS 5,510,765 A 4/1996 Madau
5,797,134 A 8/1998 McMillan et al.
(Continued)

FOREIGN PATENT DOCUMENTS

EP 1921580 A1 5/2008
WO 2010034909 A1 4/2010
(Continued)

OTHER PUBLICATIONS

Tomer Toledo, Oren Musicant and Tsippy Lotan In-vehicle data recorders for monitoring and feedback on drivers' behavior, Transportation Research Part C: Emerging Technologies, vol. 16, Issue 3, 2008, pp. 320-331, ISSN 0968-090X, https://doi.org/10.1016/j.trc.2008.01.001.*

(Continued)

*Primary Examiner* — Asha Puttaiah
(74) *Attorney, Agent, or Firm* — Banner & Witcoff, Ltd.

(57) ABSTRACT

Methods, computer-readable media, systems and apparatuses for determining and implementing risk unit based insurance policies are presented. A user may receive a plurality of risk units associated with an insurance policy. The risk units may be stored in a risk unit account associated with the user, the vehicle, etc. During operation of the vehicle, sensor data may be received. The sensor data may provide information associated with driving behaviors of the user, environmental conditions in which the vehicle is being operated, and the like. A consumption rate of the risk units may be determined based, at least in part, on the received sensor data. If a number of risk units in a risk unit account is below a predetermined threshold, a notification may be transmitted to the user and/or a predetermined number of risk units may be automatically added to the risk unit account.

20 Claims, 10 Drawing Sheets

(51) Int. Cl.
- *B60W 10/04* (2006.01)
- *B60W 10/30* (2006.01)
- *H04W 68/00* (2009.01)
- *G07C 5/08* (2006.01)
- *G07C 5/00* (2006.01)
- *G01C 21/34* (2006.01)
- *G06Q 40/00* (2012.01)

(52) U.S. Cl.
CPC ......... *G01C 21/3469* (2013.01); *G06Q 40/02* (2013.01); *G07C 5/008* (2013.01); *G07C 5/08* (2013.01); *H04W 68/00* (2013.01); *G06Q 40/00* (2013.01)

(56) References Cited

U.S. PATENT DOCUMENTS

| | | |
|---|---|---|
| 6,556,905 B1 | 4/2003 | Mittelsteadt et al. |
| 6,868,386 B1 | 3/2005 | Henderson et al. |
| 7,117,173 B1 | 10/2006 | Ambani |
| 7,323,970 B1 | 1/2008 | Murray et al. |
| 7,865,378 B2 | 1/2011 | Gay |
| 7,890,355 B2 | 2/2011 | Gay et al. |
| 7,937,278 B1 | 5/2011 | Cripe et al. |
| 7,941,258 B1 | 5/2011 | Mittelsteadt et al. |
| 7,987,103 B2 | 7/2011 | Gay et al. |
| 7,991,629 B2 | 8/2011 | Gay et al. |
| 8,090,598 B2 | 1/2012 | Bauer et al. |
| 8,140,358 B1 | 3/2012 | Ling et al. |
| 8,180,655 B1 | 5/2012 | Hopkins, III |
| 8,280,752 B1 | 10/2012 | Cripe et al. |
| 8,407,139 B1 | 3/2013 | Palmer |
| 8,566,126 B1 | 10/2013 | Hopkins, III |
| 8,577,703 B2 | 11/2013 | McClellan et al. |
| 8,595,034 B2 | 11/2013 | Bauer et al. |
| 8,606,512 B1 | 12/2013 | Bogovich et al. |
| 8,630,768 B2 | 1/2014 | McClellan et al. |
| 8,736,483 B2 | 5/2014 | Takeuchi |
| 8,799,036 B1* | 8/2014 | Christensen ............ G07C 5/00 705/4 |
| 8,892,451 B2 | 11/2014 | Everett et al. |
| 8,935,036 B1 | 1/2015 | Christensen et al. |
| 9,037,394 B2 | 5/2015 | Fernandes et al. |
| 9,053,469 B1 | 6/2015 | Bohanek et al. |
| 9,082,072 B1 | 7/2015 | Wedding, Jr. et al. |
| 9,141,582 B1 | 9/2015 | Brinkmann et al. |
| 9,141,995 B1 | 9/2015 | Brinkmann et al. |
| 9,361,599 B1 | 6/2016 | Biemer et al. |
| 9,390,452 B1 | 7/2016 | Biemer et al. |
| 9,454,786 B1 | 9/2016 | Srey et al. |
| 9,524,269 B1 | 12/2016 | Brinkmann et al. |
| 9,535,878 B1 | 1/2017 | Brinkmann et al. |
| 9,569,799 B2 | 2/2017 | Biemer et al. |
| 9,619,203 B2 | 4/2017 | Tamir et al. |
| 9,628,958 B1 | 4/2017 | McBurney |
| 9,984,420 B1 | 5/2018 | Manzella et al. |
| 2002/0002475 A1 | 1/2002 | Freedman et al. |
| 2002/0089660 A1 | 7/2002 | Weiss |
| 2002/0111725 A1 | 8/2002 | Burge |
| 2003/0236686 A1 | 12/2003 | Matsumoto et al. |
| 2004/0064247 A1 | 4/2004 | Davis |
| 2004/0153362 A1* | 8/2004 | Bauer ............... G06Q 40/02 705/4 |
| 2005/0171663 A1 | 8/2005 | Mittelsteadt et al. |
| 2006/0052929 A1 | 3/2006 | Bastian et al. |
| 2006/0053038 A1 | 3/2006 | Warren et al. |
| 2006/0182661 A1 | 8/2006 | Aquila |
| 2007/0200663 A1 | 8/2007 | White et al. |
| 2007/0239992 A1 | 10/2007 | White et al. |
| 2007/0250382 A1 | 10/2007 | Beck |
| 2007/0282638 A1 | 12/2007 | Surovy |
| 2007/0299700 A1 | 12/2007 | Gay et al. |
| 2008/0065427 A1 | 3/2008 | Helitzer et al. |
| 2008/0164769 A1 | 7/2008 | Eck |
| 2008/0252412 A1 | 10/2008 | Larsson et al. |
| 2008/0255888 A1 | 10/2008 | Berkobin et al. |
| 2009/0024419 A1 | 1/2009 | McClellan et al. |
| 2010/0030586 A1* | 2/2010 | Taylor ............... G06Q 30/02 705/4 |
| 2010/0131304 A1* | 5/2010 | Collopy ............ G06Q 30/0224 705/4 |
| 2010/0294583 A1 | 11/2010 | Biondo et al. |
| 2011/0009107 A1 | 1/2011 | Guba et al. |
| 2011/0106370 A1 | 5/2011 | Duddle et al. |
| 2011/0112969 A1 | 5/2011 | Zaid et al. |
| 2011/0125363 A1 | 5/2011 | Blumer et al. |
| 2011/0153367 A1* | 6/2011 | Amigo ............... G06Q 40/08 705/4 |
| 2011/0173084 A1 | 7/2011 | Cheng et al. |
| 2011/0304465 A1 | 12/2011 | Boult et al. |
| 2012/0004933 A1 | 1/2012 | Foladare et al. |
| 2012/0010906 A1 | 1/2012 | Foladare et al. |
| 2012/0066007 A1 | 3/2012 | Ferrick et al. |
| 2012/0072243 A1 | 3/2012 | Collins et al. |
| 2012/0073892 A1 | 3/2012 | Hunter |
| 2012/0123806 A1 | 5/2012 | Schumann, Jr. et al. |
| 2012/0179493 A1* | 7/2012 | Giordano ............... G06Q 40/08 705/4 |
| 2012/0197669 A1 | 8/2012 | Kote et al. |
| 2012/0262283 A1 | 10/2012 | Biondo et al. |
| 2013/0006674 A1 | 1/2013 | Bowne et al. |
| 2013/0013347 A1 | 1/2013 | Ling et al. |
| 2013/0046559 A1* | 2/2013 | Coleman ............... G06Q 10/10 705/4 |
| 2013/0046562 A1 | 2/2013 | Taylor et al. |
| 2013/0110867 A1 | 5/2013 | Grabau et al. |
| 2013/0169410 A1 | 7/2013 | Amselem |
| 2013/0169442 A1 | 7/2013 | Ruocco et al. |
| 2013/0217990 A1 | 8/2013 | Saettel et al. |
| 2013/0226622 A1 | 8/2013 | Adamson et al. |
| 2013/0274955 A1 | 10/2013 | Rosenbaum |
| 2014/0006164 A1 | 1/2014 | Bellegante et al. |
| 2014/0019167 A1 | 1/2014 | Cheng et al. |
| 2014/0019170 A1 | 1/2014 | Coleman et al. |
| 2014/0046701 A1 | 2/2014 | Steinberg et al. |
| 2014/0051041 A1 | 2/2014 | Stefan et al. |
| 2014/0058761 A1 | 2/2014 | Freiberger et al. |
| 2014/0067434 A1 | 3/2014 | Bourne et al. |
| 2014/0095214 A1 | 4/2014 | Mathe et al. |
| 2014/0108058 A1 | 4/2014 | Bourne et al. |
| 2014/0114674 A1 | 4/2014 | Krughoff et al. |
| 2014/0148972 A1 | 5/2014 | Basir et al. |
| 2014/0164027 A1 | 6/2014 | Cheung et al. |
| 2014/0172467 A1 | 6/2014 | He et al. |
| 2014/0180727 A1 | 6/2014 | Freiberger et al. |
| 2014/0257862 A1 | 9/2014 | Billman et al. |
| 2014/0257863 A1 | 9/2014 | Maastricht et al. |
| 2014/0257866 A1 | 9/2014 | Gay et al. |
| 2014/0257867 A1 | 9/2014 | Gay et al. |
| 2014/0257871 A1 | 9/2014 | Christensen et al. |
| 2014/0257873 A1 | 9/2014 | Hayward et al. |
| 2014/0257874 A1 | 9/2014 | Hayward et al. |
| 2014/0278574 A1 | 9/2014 | Barber |
| 2014/0278837 A1 | 9/2014 | Blumer et al. |
| 2014/0297348 A1 | 10/2014 | Ellis |
| 2014/0335902 A1 | 11/2014 | Guba et al. |
| 2015/0019268 A1 | 1/2015 | Handel et al. |
| 2015/0025917 A1 | 1/2015 | Stempora |
| 2015/0032481 A1 | 1/2015 | Norling-Christensen et al. |
| 2015/0045983 A1 | 2/2015 | Fraser et al. |
| 2015/0081404 A1 | 3/2015 | Basir |
| 2015/0106289 A1 | 4/2015 | Basir et al. |
| 2015/0134368 A1 | 5/2015 | Lee |
| 2015/0141043 A1 | 5/2015 | Abramson et al. |
| 2015/0161738 A1 | 6/2015 | Stempora |
| 2015/0168174 A1 | 6/2015 | Abramson et al. |
| 2015/0253144 A1 | 9/2015 | Rau et al. |
| 2016/0086397 A1 | 3/2016 | Phillips |
| 2016/0171620 A1* | 6/2016 | Bogovich ............... G06Q 40/08 705/4 |
| 2016/0189304 A1 | 6/2016 | Todasco et al. |
| 2016/0205238 A1 | 7/2016 | Abramson et al. |
| 2016/0379310 A1 | 12/2016 | Madigan et al. |

(56) References Cited

U.S. PATENT DOCUMENTS

2017/0021764 A1    1/2017   Adams et al.
2018/0060970 A1    3/2018   Oduor et al.
2019/0066223 A1    2/2019   Bogovich et al.

FOREIGN PATENT DOCUMENTS

WO      2014151155 A1    9/2014
WO      2014181303 A1    11/2014

OTHER PUBLICATIONS

Feb. 16, 2018—U.S. Non-Final Office Action—U.S. Appl. No. 14/988,977.
Jul. 3, 2018—(EP) Supplementary Search Report—EP16743838.1.
Oct. 29, 2018—U.S. Non-Final Office Action—U.S. Appl. No. 15/138,516.
May 22, 2018—(CA) Office Action—App 2,975,084.
Oct. 4, 2016—U.S. Notice of Allowance—U.S. Appl. No. 15/170,084.
Oct. 6, 2016—U.S. Notice of Allowance—U.S. Appl. No. 15/170,203.
Aug. 10, 2018—U.S. Final Office Action—U.S. Appl. No. 14/988,977.
Jun. 1, 2018—(CA) Office Action—App 2,975,085.
Jul. 23, 2018—(EP) Extended search report—App 16743837.3.
Nov. 28, 2017—(WO) International Search Report & Written Opinion—PCT/US17/050231.
Mar. 28, 2019—U.S. Notice of Allowance—U.S. Appl. No. 15/397,199.
Mar. 12, 2019—U.S. Final Office Action—U.S. Appl. No. 15/138,516.
Mar. 14, 2019—U.S. Non-Final Office Action—U.S. Appl. No. 15/138,576.
Mar. 26, 2019—(CA) Office Action—App 2,975,085.
Feb. 5, 2019—(CA) Notice of Allowance—App 2,975,084.
Jun. 15, 2015—U.S. Non-Final Office Action—U.S. Appl. No. 14/607,636.
Sep. 16, 2015—U.S. Final Office Action—U.S. Appl. No. 14/607,636.
Feb. 11, 2016—U.S. Notice of Allowance—U.S. Appl. No. 14/607,636.
Mar. 29, 2016—WO Search Report and Written Opinion—App PCT/US2016/013201.
Mar. 29, 2016—WO Search Report and Written Opinion—App PCT/US16/013192.
Jan. 11, 2019—U.S. Non-Final Office Action—U.S. Appl. No. 15/0379,019.
Jan. 25, 2019—U.S. Non-Final Office Action—U.S. Appl. No. 15/262,541.
May 29, 2013—(U.S.) Notice of Allowance—U.S. Appl. No. 14/988,977.
"Usage-Based Auto Insurance (UBI) A revolution is underway . . . Is your Company Ready?" by Robin Harbage, FCAS, MAAA. Pub. Dec. 2011. (Year: 2011).
"Profiting From Business Model Innovation: Evidence from Pay-As-You-Drive Auto Insurance" by Panos Desyllas and Mari Sako. Research Policy 42 (2013) 101-116. Available Online: Jun. 25, 2012. (Year: 2012).
Jun. 10, 2019 (U.S.) Final Office Action—U.S. Appl. No. 15/262,541.
Jun. 18, 2019 (U.S.) Corrected Notice of Allowance and Fees Due—U.S. Appl. No. 14/988,977.
Jul. 10, 2019—(US) Notice of Allowance—U.S. Appl. No. 15/397,199.
Jul. 19, 2019—(US) Notice of Allowance—U.S. Appl. No. 15/397,019.

\* cited by examiner

RISK UNIT CONSUMPTION RATE     500

VEHICLE ID: [VEHICLE 1] — 502

OPERATOR: [NAME 1] — 504

DATE/TIME: [MM/DD/YYYY HH:MM] — 506

DATA BEING RECEIVED? [YES] — 508

CURRENT CONSUMPTION RATE [X.X] UNITS/HOUR — 510

HISTORICAL CONSUMPTON RATE — 512
- DATE 1    Y.Y UNITS/HR
- DATE 2    Z.Z UNITS/HR
- DATE 3    X.X UNITS/HR
- DATE 4    A.A UNITS/HR

[CANCEL]     [OK]

FIG. 5

RISK UNIT BASED POLICIES

CROSS REFERENCE TO RELATED APPLICATIONS

This application is a divisional of and claims priority to copending U.S. application Ser. No. 14/607,662, filed Jan. 28, 2015, and entitled "Risk Unit Based Policies," which is incorporated herein by reference in its entirety.

TECHNICAL FIELD

Various aspects of the disclosure relate to risk unit based insurance systems for determining and implementing risk unit based insurance policies. More specifically, aspects of the disclosure relate to determining a risk unit, providing a plurality of risk units to a user, receiving and analyzing various driver data, vehicle data, and/or driving trip data, determining a consumption rate of risk units (or other units within an account) and reducing a balance in a risk unit account based on the consumption rate in accordance with risk unit based insurance policies.

BACKGROUND

Vehicle insurance policies are generally purchased by insurance customers from various insurance providers. Conventional policies generally provide coverage to the user for a term of the policy based on payment of a premium associated with the policy. Such term based policies might not account for driving behaviors, environmental conditions, or the like. Rather, coverage may be provided for the term, regardless of how, where, when, etc. the driver operates the vehicle.

Many vehicles include sensors and internal computer systems designed to store and monitor driving data, vehicle operation data, driving conditions, and driving functions. Many vehicles also include one or more communication systems designed to send and receive information from inside or outside the vehicle. Such information can include, for example, vehicle operational data, driving conditions, and communications from other vehicles or systems.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for determining and implementing risk unit based insurance policies. In some arrangements, a user may receive a plurality of risk units associated with an insurance policy, such as an auto insurance policy. The risk units may be stored in a risk unit account associated with the user, the vehicle, etc. During operation of the vehicle, sensor data may be received. The sensor data may provide information associated with driving behaviors of the user, environmental conditions in which the vehicle is being operated, and the like. A consumption rate of the risk units may be determined based, at least in part, on the received sensor data. Consumption rate may also be based on additional factors, such as driving experience, policy coverage, vehicle features, and the like. In some examples, the consumption rate may be based on a combination of factors or on only sensor data factors or only other factors not determined based on sensor data. Accordingly, as the vehicle is operated, a number or balance of risk units in the risk unit account may be reduced based on the determined consumption rate.

In some examples, a determination may be made as to whether a number or balance of risk units in the risk unit account is below a predetermined threshold. If so, a notification may be transmitted to the user. In some arrangements, the notification may include a request for user input to purchase additional risk units (e.g., a request for user input identifying a number of additional risk units to purchase, payment information, etc.). In some examples, upon determining that the balance of risk units in the risk unit account is below the predetermined threshold, a predetermined number of risk units may be added to the risk unit account and a cost associated with purchase of the additional risk units may be paid automatically using predetermined or prestored payment information.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5 is an example user interface providing information to a user regarding a risk unit consumption rate according to one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
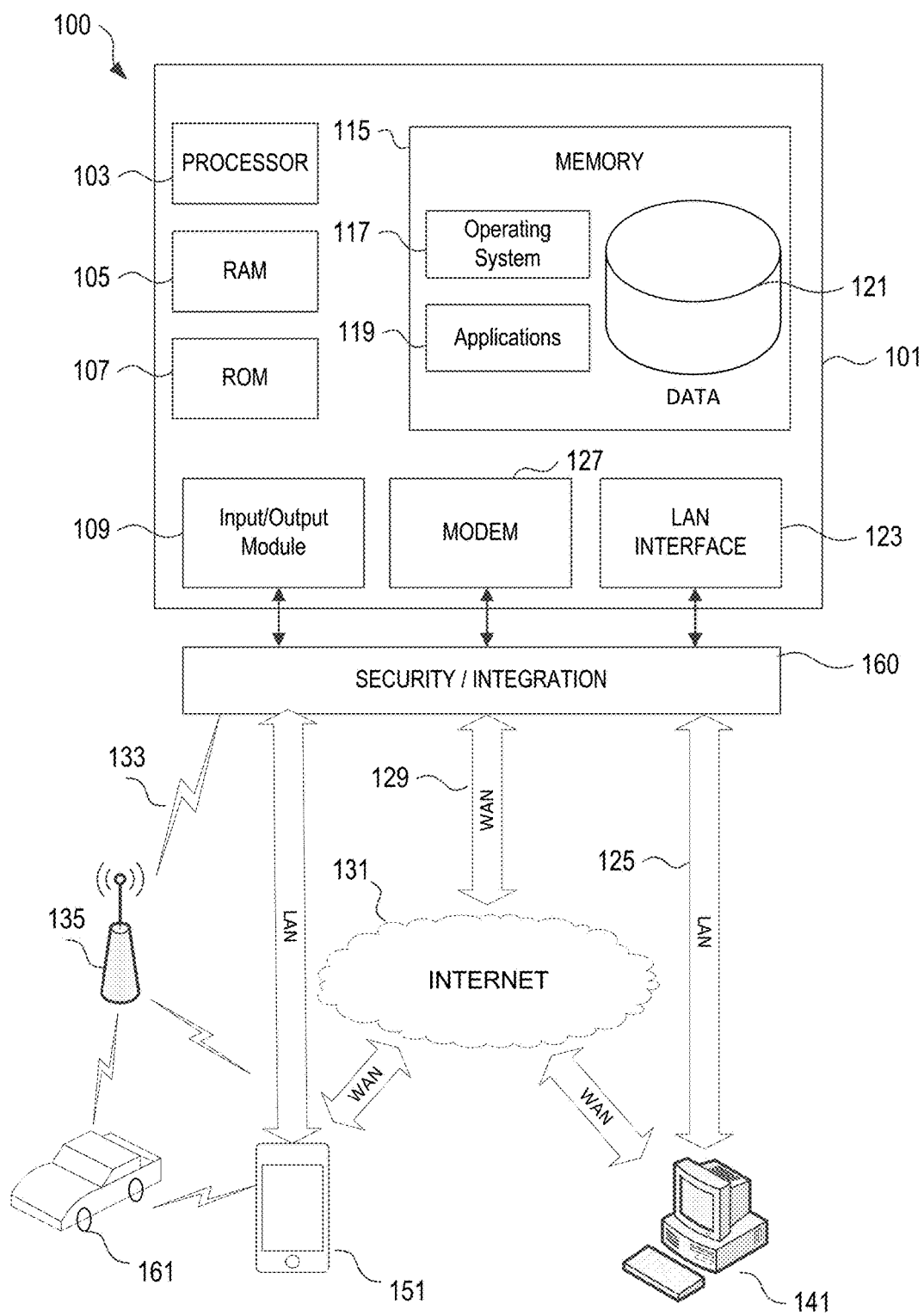
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices described herein, such as personal mobile devices, vehicle-based computing devices, insurance systems servers, external data sources and other various devices in a risk unit based insurance system. These various computing systems may be configured individually or in combination, as described herein, for determining and/or providing one or more risk units to a user, maintaining an account of risk units for a user, determining a rate at which a balance in the account may be reduced (e.g., based on various driving factor, external factors, traditional insurance factors, or the like), automatically refilling a risk unit account based on the balance reaching a predetermined threshold, and the like, using the devices of the risk unit based insurance systems described herein. In addition to the features described above, the techniques described herein also may be used for generating and presenting insurance recommendations to customers, insurance underwriting, and other insurance-related tasks.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within risk unit based insurance systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, insurance system server 101, etc.), in order to collect and analyze driver data, vehicle data, and/or driving trip data, determine risk unit based insurance policy parameters, determine rate at which risk units are consumed during operation of a vehicle, etc., using the various devices of the risk unit based insurance systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, determine a risk unit balance in a risk unit account, to receive and analyze driver data, vehicle data, and/or driving trip data, determine a rate at which risk units are consumed (e.g., based on analyzed driver data, vehicle data, external data, or the like), and/or automatically refill a risk unit account balance upon determining that the balance has reached a predetermined threshold.

The computing device (e.g., a personal mobile device, vehicle-based system, insurance system server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, an insurance server, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting a cloud-based vehicle identification and vehicle and driver data retrieval and analysis. In other examples, the security and integration layer 160 may correspond to separate hardware and software components which may be operated at a separate physical location and/or by a separate entity.

As discussed below, the data transferred to and from various devices in a risk unit based insurance system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a personalized insurance system, such as personal mobile devices, vehicle-based devices, insurance servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, driving trip data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, and/or driving trip data analysis web service, a risk unit based insurance policy determination or offer web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, driving behaviors or characteristics, passenger-related data, vehicle data, driving trip data, account balance data, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of risk unit based insurance systems, such as faster response times and less dependence on network conditions when transmitting and receiving driver information, vehicle information, driving trip information, insurance parameters, account balance information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in risk unit based insurance system components described herein may be configured to communicate using any of these network protocols or technologies.

Additionally, one or more application programs 119 may be used by the various computing devices 101 within a risk unit based insurance system 100 (e.g., vehicle data, driver data, and/or driving trip data analysis software applications, insurance parameter determination software applications, risk unit account applications, etc.), including computer executable instructions for receiving and analyzing various driver data, vehicle data, and/or driving trip data, determining parameters for risk unit insurance policies, presenting risk unit based insurance policies via the devices in the risk unit based insurance system, determining a rate at which risk units are consumed during operation of a vehicle, and evaluating and/or automatically refilling a balance of a risk unit account using the devices of the risk unit based insurance systems.

Figure 2:
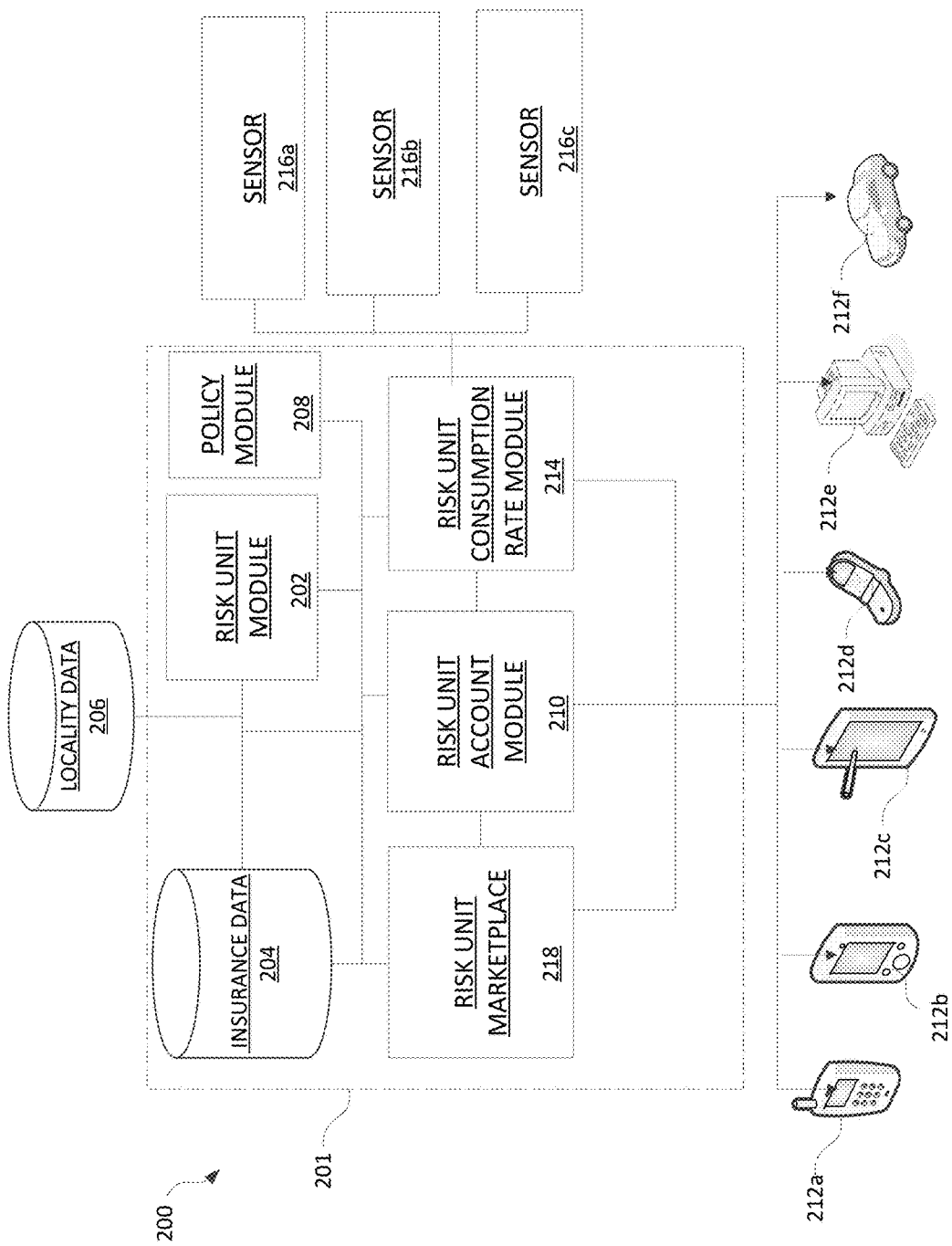
FIG. 2 is an example risk unit based insurance system according to one or more aspects described herein.

FIG. 2 is a schematic diagram of an illustrative risk unit based insurance system 200. The risk unit based insurance system 200 may be associated with, internal to, operated by, or the like, an entity 201, such as an insurance provider. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

The risk unit based insurance system 200 may include one or more modules that may include hardware and/or software configured to perform various functions within the system 200. The one or more modules may be separate, physical devices or, in other examples, one or more modules may be part of the same physical device.

The risk unit based insurance system may include a risk unit module 202. The risk unit module 202 may be configured to determine a cost to insure an average user for a predetermined period of time. For instance, the risk unit module 202 may receive data, such as insurance data from insurance data store 204, locality data from locality data store 206, as well as other data (from data stores not shown that may be internal to the entity 201 or external to the entity 201), and determine, based on the received data, the cost to insure an average user over a predetermined period of time (e.g., one month, one week, one day, one year, or the like). This cost may be considered equivalent to one risk unit. Further, a cost to the user or insurance policy holder to purchase a risk unit may be determined by the system. This cost may be different from the cost forming the risk unit and may be determined on a fixed date. The cost to the user may then be revised at a second date (e.g., monthly, annually, etc.). Accordingly, insurance may be provided to one or more users based on risk units, as will be discussed more fully herein.

The risk unit based insurance system 200 may further include a policy module 208. The policy module 208 may generate and/or store insurance policies using risk units, as well as insurance policy information or factors, such as vehicle information, driving record/experience, policy limits, deductibles, etc. That is, a user may be insured through a policy that provides a number of risk units for a particular cost (e.g., insurance premium). The risk units may then be consumed by the user as, for example, the user drives or operates his or her vehicle. The risk units may be consumed based on sensor data-focused factors, such as time elapsed, driving habits of the user, environmental conditions in which the user operates the vehicle, vehicle parameters (such as year, make, model, features, specifications, etc.), condition or performance of the vehicle (e.g., based on sensor data), and the like, as well as traditional policy factors, such as driving experience, driving record, credit variables, policy coverage, deductible, policy limits, familiarity of the driver with the vehicle or surroundings, and the like. In some examples, one policy parameter may include a level of coverage. For instance, risk units may be purchased at various levels with each level providing a different level of coverage, as will be discussed more fully herein. Additionally or alternatively, the consumption rate may reflect different levels of coverage.

The insurance policies based on risk units may further include a risk unit account stored in risk unit account module 210. The risk unit account module 210 may include one or more accounts associated with one or more users (e.g., users having risk unit based insurance policies), vehicles (e.g., vehicles associated with a risk unit based insurance policy), or the like. The accounts may include information associated with a user such as name, address, contact information, and the like, as well as information associated with the vehicle, such as vehicle identification number, make, model, year, etc. Further, the accounts may include a number of risk units associated with or available to the user or account holder, associated with the vehicle, etc. Accordingly, if a user has a risk unit based insurance policy that includes the purchase of 100 risk units, the user account will show, at the purchase, 100 risk units. As the risk units are consumed (e.g., by the user operating the vehicle, or the like) a balance of risk units in the account may be reduced. In some examples, the balance of risk units in an account may be displayed to the user via a computing device, such as one or more of computing devices 212a-212f. For instance, the risk unit account balance may be displayed via an application (e.g., online or mobile application) on a smartphone 212a, personal digital assistant (PDA) 212b, tablet 212c, cell phone 212d, or other computing device 212e. In some examples, the risk unit account balance may be displayed to a user on a vehicle display 212f. In addition to display of the account balance, various other account details may be displayed as desired.

In some arrangements, the risk unit account may include units of another type (e.g., other than risk units). For instance, the risk unit account may include an amount or balance of funds or money. The balance of funds may be reduced based on operation of the vehicle, as discussed above. In some examples, the risk units may be converted to funds in order to facilitate this reduction of balance (e.g., the consumption rate of units based on operation of the vehicle may be determined in risk units and then converted to funds in order to reduce the balance in the account appropriately). In other examples, the consumption rate may be determined in monetary units and the balance reduced as appropriate. Although various arrangements discussed herein will be described in terms of consumption rate being determined in risk units and a balance of an account including a number of risk units reduced accordingly, various other units may be used (e.g., monetary units) without departing from the invention.

The risk unit based insurance system 200 may further include a risk unit consumption rate module 214. The risk unit consumption rate module 214 may include hardware and/or software configured to determine and/or implement a consumption rate of risk units due to operation of the vehicle (e.g., as the user operates the vehicle, the number or balance of risk units in the risk unit account is reduced based on a determined consumption rate, thereby depleting the balance associated with the policy. Once the balance of risk units reaches a predetermined threshold, the number of risk units may be replenished, akin to renewal of a conventional insurance policy). As discussed above, the consumption rate may be determined in risk units, monetary units or other units, as desired.

As discussed above, the rate at which risk units are consumed by a user (e.g., by a user's operation of a vehicle) may be based on a variety of factors, such as personal information of the user, driving habits or behaviors of the user, environmental conditions, locality or geographic conditions, types of road being travelled, traditional policy factors, coverage, vehicle features or operation, and the like. Various algorithms may be used to determine the consumption rate. For example, Equation 1 is one example that may be used to determine consumption rate based on sensor data-focused factors may include:

$$RC_1 = L_1 \times R_1 \times T_1 \times B_1 \times E_1, \text{ where} \qquad \text{Equation 1}$$

$RC_1$ is the Rate of Consumption;

$L_1$ is a location factor that may include population density, traffic density, new route, commonly used route, and the like;

$R_1$ is a road condition factor that may include type of road, road geometry, road hazards, and the like;

$T_1$ is a time of day factor;

$B_1$ is a driver behavior factor and may include braking rate, acceleration rate, cornering, trip duration, swerving, distracted driving, and the like; and $E_1$ is an environmental factor that may include weather conditions, contextual speed, and the like.

Equation 2 is another example that may be used to determine consumption rate based on sensor data-focused factors, as well as traditional policy factors, may include:

$$RC_2 = O_2 \times P_2 \times V_2 \times C_2 \times L_2 \times R_2 \times T_2 \times B_2 \times E_2, \text{ where} \qquad \text{Equation 2}$$

$RC_2$ is the Rate of Consumption;

$O_2$ is an operator factor and may include driver age, gender, marital status, driving experience, driving record, and the like;

$P_2$ is a policy factor and may include credit variables, number of vehicles associated with a policy or driver, number of operators or drivers associated with a policy, prior insurance, multiple policies, and the like;

$V_2$ is a vehicle factor and may include vehicle identification number, aftermarket parts, vehicle features or specifications, vehicle condition, maintenance history, and the like;

$C_2$ is a coverage factor and may include coverages provided, policy or coverage limits, deductibles, and the like;

$L_2$ is a location factor that may include population density, traffic density, new route, commonly used route, and the like;

$R_2$ is a road condition factor that may include type of road, road geometry, road hazards, and the like;

$T_2$ is a time of day factor;

$B_2$ is a driver behavior factor and may include braking rate, acceleration rate, cornering, trip duration, swerving, distracted driving, and the like; and $E_2$ is an environmental factor that may include weather conditions, contextual speed, and the like.

In addition, either Equation 1 or Equation 2 may further include an expenses factor. In some examples, an expenses value may be added to the result of Equation 1 or Equation 2 in order to determine the consumption rate.

Further, although Equation 1 and Equation 2 are provided as examples for determining consumption rate, various other equations and/or algorithms may be used without departing for the invention. For instance, one or more factors may be removed from the equation to determine consumption rate. Additionally or alternatively, other factors may be included in the equations, without departing from the invention.

Accordingly, one or more sensors 216 may be used to obtain data that may be used to determine the consumption rate for the user. For instance, the one or more sensors may include sensors to detect driving behaviors of the user, such as hard braking, speeding, and the like. In another example, one or more sensors may be used to detect environmental conditions such as precipitation, humidity, cloud cover, or the like. In still another example, one or more sensors may be used to determine road conditions or to obtain information from outside sources (e.g., external databases, or the like) regarding traffic conditions, types of road (e.g., two-lane road, four-lane road), speed limit of the road, or the like. The data from one or more sensors 216, which may include data from combinations of different types of sensors, may be used by the risk unit consumption rate module 214 to determine a risk unit consumption rate for the user.

In examples in which the consumption rate is determined based on traditional policy factors (either in combination with sensor data-focused factors or alone) the traditional policy factors, such as driving record, credit information, driving experience, vehicle features and/or specifications, coverages, deductibles, policy limits, etc. may be obtained from, for example, policy module 208. In some examples, the risk unit consumption rate may be determined or calculated for a particular trip. Additionally or alternatively, the consumption rate may be calculated or determined in real-time or near real-time, such that the rate may change as the user's driving behavior changes, as the type of road changes, as the environmental conditions change, or the like. Thus, for example, if a user is driving at speed higher than the speed limit and it is raining, the consumption rate may be higher than if the user is driving at the speed limit and/or there is no precipitation. This is merely one example of how consumption rate may change based on received sensor data and should not be viewed as limiting the disclosure to only this example. Rather, various other changes in received sensor data may be used to modify or alter the risk unit consumption rate for the user.

Similar to the risk unit account information, the risk unit consumption rate may be displayed to a user, such as via one or more computing devices 212a-212f. In some examples, the risk unit consumption rate module 214 may generate and/or display to a user suggestions for improving the consumption rate. For instance, the system may generate an alternate route that has been determined to be safer than the user's current route and, thus, by taking the alternate route, the consumption rate may be reduced. In another example, a user may be driving faster than a posted speed limit. The system may generate a notice to display to the user (e.g., via a computing device 212a-212f) indicating that, by slowing down, the user's consumption rate may be reduced. These are merely some examples of messages that may be displayed in order to aid the user in reducing the consumption rate of the risk units. However, various other suggestions or driving behavior modifications may be generated and provided to the user without departing from the invention.

The risk unit based insurance system 200 may further include a risk unit marketplace 218. The risk unit marketplace 218 may be connected to or in communication with various other modules within the system 200. In some examples, the risk unit marketplace may be used to refill a user's risk unit account. For instance, upon the user reaching a predetermined threshold within the risk unit account of the user (e.g., the balance of risk units within the account reaches a certain threshold) the user may be notified that the balance of risk units in the account is low and may offer one or more options for purchasing additional risk units or otherwise increasing the balance of risk units in the account.

For example, in some instances, upon reaching the threshold number of risk units within the account, a notification may be displayed to the user (e.g., via one or more of computing devices 212a-212f) indicating that the balance is low and offering additional risk units for sale. In some examples, the user may store credit card or other payment information (e.g., account information, debit card information, electronic funds transfer information, and the like) in the system (e.g., within the risk unit marketplace 218) such that, upon receiving the notification, the user may select a "purchase" option and a predetermined number of risk units may be purchased by the user and charged to the stored payment information. In another example, the user may select an automatic refill option. In such arrangements, a user may input payment information (e.g., credit card information, debit card information, checking or other account information, electronic funds transfer information, and the like) and may identify a predetermined threshold below which the system may automatically purchase additional risk units. These and various other arrangements will be discussed more fully below.

The risk unit marketplace 218 may also provide risk units for sale to other users or insurance providers. For instance, a user may obtain insurance through a different insurance provider but the risk units may be common units among a plurality of insurance providers. Accordingly, users having insurance policies with other providers may purchase risk units from the risk unit marketplace 218 and may have the risk units placed in an account associated with the policy provided by or associated with the other insurance provider. In some examples, entity 201 may charge a service fee or surcharge for purchase of risk units for use with a policy provided by another insurance carrier.

Figure 3:
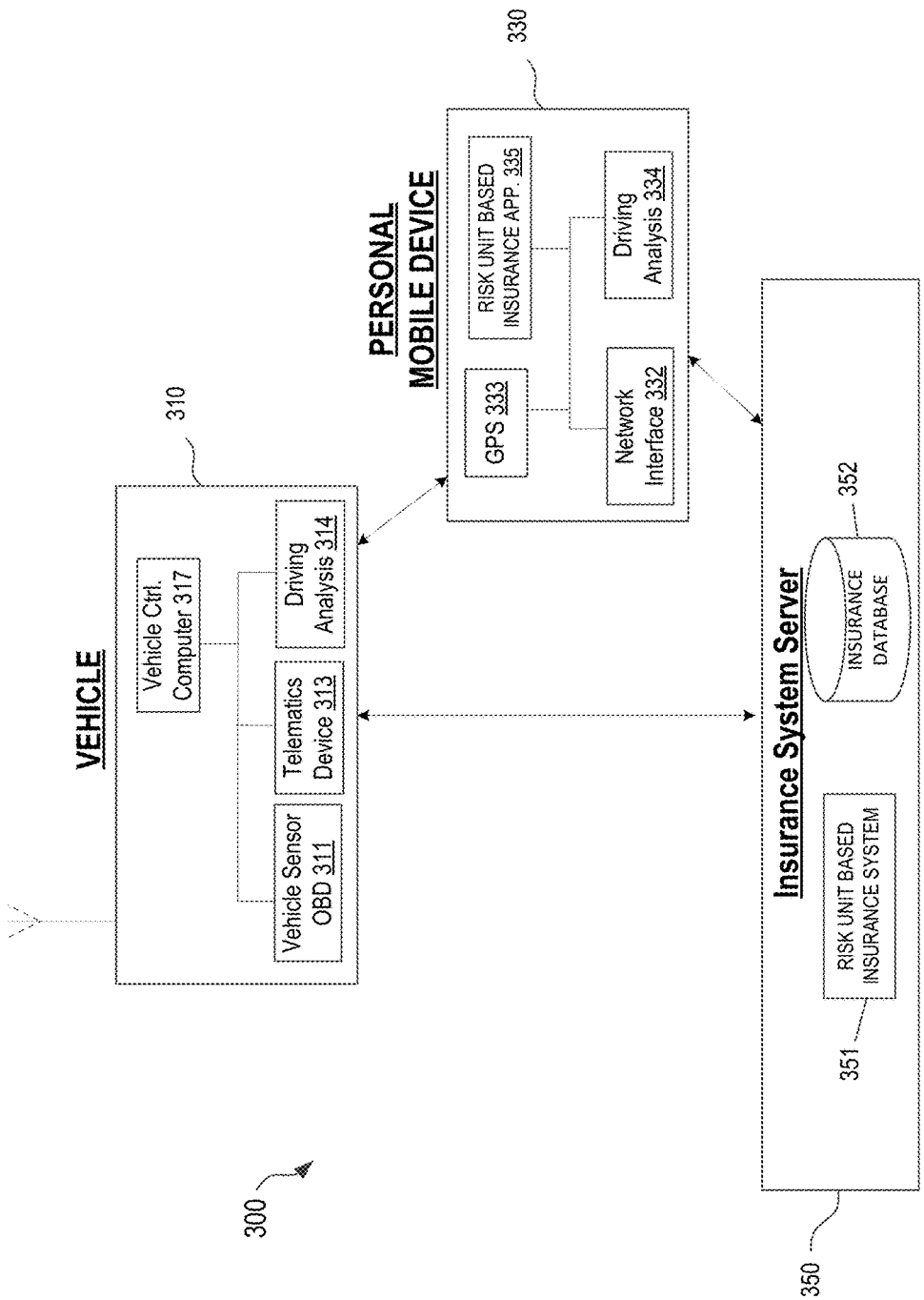
FIG. 3 is an example risk unit based insurance system environment illustrating various communications between vehicles-based devices, a personal mobile device, and an insurance system server, according to one or more aspects of the disclosure.

FIG. 3 is a diagram of an illustrative system driving analysis system 300 including additional aspects of the risk unit based insurance system 200 shown in FIG. 2 and/or implementing the risk unit based insurance system 200 of FIG. 2. The system includes a vehicle 310, a personal mobile device 330, an insurance system server 350, and additional related components. As discussed below, the components of the system 300, individually or using communication and collaborative interaction, may determine, present, and implement various types of risk unit based insurance to customers, including providing or facilitating purchase of a risk unit based insurance policy and/or associated risk units, determining a consumption rate of risk units, communicating a consumption rate to a user, generating and providing suggestions to a user for reducing consumption rate, etc. To perform such features, the components shown in FIG. 3 each may be implemented in hardware, software, or a combination of the two. Additionally, each component of the system 300 may include a computing device (or system) having some or all of the structural components described above for computing device 101.

Vehicle 310 in the system 300 may be, for example, an automobile, a motorcycle, a scooter, a bus, a recreational vehicle, a boat, or other vehicle for which vehicle data, location data, driver data (or operator data), operational data and/or other driving data (e.g., location data, time data, weather data, etc.) may be collected and analyzed. The vehicle 310 includes vehicle operation sensor 311 (similar to one or more of sensors 216a-216c of FIG. 2) capable of detecting and recording various conditions at the vehicle and operational parameters of the vehicle. For example, sensor 311 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 311 also may detect and store data received from the vehicle's 310 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 311 may detect and store the external driving conditions, for example, external temperature, rain, snow, light levels, and sun position for driver visibility. For example, external cameras and proximity sensors 311 may detect other nearby vehicles, vehicle spacing, traffic levels, road conditions, traffic obstructions, animals, cyclists, pedestrians, and other conditions that may factor into a driving data/behavior analysis. Sensor 311 also may detect and store data relating to moving violations and the observance of traffic signals and signs by the vehicle 310. Additional sensors 311 may detect and store data relating to the maintenance of the vehicle 310, such as the engine status, oil level, engine coolant temperature, odometer reading, the level of fuel in the fuel tank, engine revolutions per minute (RPMs), software upgrades, and/or tire pressure.

Vehicles sensor 311 also may include cameras and/or proximity sensors capable of recording additional conditions inside or outside of the vehicle 310. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 311 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 310. Sensor 311 also may be configured to collect data relating to a driver's movements or the condition of a driver. For example, vehicle 310 may include sensors that monitor a driver's movements, such as the driver's eye position and/or head position, etc. Additional sensors 311 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 311 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 311 may determine when and how often the vehicle 310 stays in a single lane or strays into other lane. A Global Positioning System (GPS), locational sensors positioned inside the vehicle 310, and/or locational sensors or devices external to the vehicle 310 may be used to determine the route, speed, lane position, road-type (e.g. highway, entrance/exit ramp, residential area, etc.) and other vehicle position/location data.

The data collected by vehicle sensor 311 may be stored and/or analyzed within the vehicle 310, such as for example a driving analysis computer 314 integrated into the vehicle, and/or may be transmitted to one or more external devices. For example, as shown in FIG. 3, sensor data may be transmitted via a telematics device 313 to one or more remote computing devices, such as personal mobile device 330, insurance system server 350, and/or other remote devices.

As shown in FIG. 3, the data collected by vehicle sensor 311 may be transmitted to an insurance system server 350, personal mobile device 330, and/or additional external servers and devices via telematics device 313. Telematics device 313 may be one or more computing devices containing many or all of the hardware/software components as the computing device 101 depicted in FIG. 1. As discussed above, the telematics device 313 may receive vehicle operation data and driving data from vehicle sensor 311, and may transmit the data to one or more external computer systems (e.g., insurance system server 350 of an insurance company, financial institution, or other entity) over a wireless transmission network. Telematics device 313 also may be configured to detect or determine additional types of data relating to real-time driving and the condition of the vehicle 310. The telematics device 313 also may store the type of vehicle 310, for example, the make, model, trim (or sub-model), year, and/or engine specifications, as well as other information such as vehicle owner or driver information, insurance information, and financing information for the vehicle 310.

In the example shown in FIG. 3, telematics device 313 may receive vehicle driving data from vehicle sensor 311, and may transmit the data to an insurance system server 350. However, in other examples, one or more of the vehicle sensors 311 or systems may be configured to receive and transmit data directly from or to an insurance system server 350 without using a telematics device. For instance, telematics device 313 may be configured to receive and transmit data from certain vehicle sensors 311 or systems, while other sensors or systems may be configured to directly receive and/or transmit data to an insurance system server 350 without using the telematics device 313. Thus, telematics device 313 may be optional in certain embodiments.

The system 300 in FIG. 3 also includes a mobile device 330. Mobile devices 330 may be, for example, smartphones or other mobile phones, personal digital assistants (PDAs), tablet computers, and the like, and may include some or all of the elements described above with respect to the computing device 101. As shown in this example, some mobile devices in systems 300 (e.g., mobile device 330) may be configured to establish communication sessions with vehicle-based devices and various internal components of vehicle 310 via wireless networks or wired connections (e.g., for docked devices), whereby such mobile devices 330 may have secure access to internal vehicle sensors 311 and other vehicle-based systems. However, in other examples, the mobile device 330 might not connect to vehicle-based computing devices and internal components, but may operate independently by communicating with vehicle 310 via their standard communication interfaces (e.g., telematics device 313, etc.), or might not connect at all to vehicle 310.

Mobile device 330 may include a network interface 321, which may include various network interface hardware (e.g., adapters, modems, wireless transceivers, etc.) and software components to enable mobile device 330 to communicate with insurance system server 350, vehicle 310, and various other external computing devices. One or more specialized software applications, such as a driving analysis application 334 and/or a risk unit based insurance application 335 may be stored in the memory of the mobile device 330. The driving analysis application 334 and risk unit based insurance application 335 may be received via network interface 321 from the insurance server 350, vehicle 310, or other application providers (e.g., application stores). As discussed below, the driving analysis application 334 and risk unit based insurance application 335 may or may not include various user interface screens, and may be configured to run as user-initiated applications or as background applications. The memory of the mobile device 330 also may include databases configured to receive and store vehicle data, driving data, driving trip data, and the like, associated with one or more drivers and/or vehicles.

Like the vehicle-based computing devices in vehicle 310, mobile device 330 also may include various components configured to generate and/or receive vehicle data, driver data, and driving data or other operational data. For example, using data from the GPS receiver 333, a driving analysis software application 334 may be able to identify starting and stopping points of driving trips, determine driving speeds, times, routes, and the like. Additional components of mobile device 330 may be used to generate or receive driving data for the driving data analysis application 334 and/or risk unit based insurance application 335, such as an accelerometer, compass, and various cameras and proximity sensors. As discussed below, these and other mobile device components may be used to receive, store, and output various user/driver data, to identify starting and stopping points and other characteristics of driving trips, to determine various driving data such as speeds, driving routes and times, acceleration, braking, and turning data, and other driving conditions and behaviors. In some implementations, the driving analysis software application 334 may store and analyze the data from various mobile device components, and the risk unit based insurance application 335 may use this data, alone or in any combination with other components or devices (e.g., insurance server 350), to determine and present insurance offers, insurance costs, and the like.

When mobile computing devices within vehicles are used to detect vehicle driving data and/or to receive vehicle driving data from vehicle sensors, such mobile computing devices 330 may store, analyze, and/or transmit the vehicle driver data (e.g., data identifying a current driver), driving data (e.g., speed data, acceleration, braking, and turning data, and any other vehicle sensor or operational data), and driving trip data (e.g., driving route, driving times, driving destinations, etc.), to one or more other devices. For example, mobile computing device 330 may transmit driver data, driving data and driving behaviors, and driving trip data directly to one or more insurance servers 350, and thus may be used in conjunction with or instead of telematics devices 313. Moreover, the processing components of the mobile computing device 330 may be used to identify vehicle drivers and passengers, analyze vehicle driving data, analyze driving trips, determine parameters related to aspects of risk unit based insurance policies, and perform other related functions. Therefore, in certain embodiments, mobile computing device 330 may be used in conjunction with, or in place of, the insurance system server 350.

Vehicle 310 may include driving analysis computer 314, which may be separate computing devices or may be integrated into one or more other components within the vehicle 310, such as the telematics device 313, autonomous driving systems, or the internal computing systems of vehicle 310. As discussed above, driving analysis computers 314 also may be implemented by computing devices independent from the vehicle 310, such as mobile computing device 330 of the drivers or passengers, or one or more separate computer systems (e.g., a user's home or office computer). In any of these examples, the driving analysis computer 314 may contain some or all of the hardware/software components as the computing device 101 depicted in FIG. 1. Further, in certain implementations, the functionality of the driving analysis computers, such as storing and analyzing driver data, vehicle data, driving data and driving behaviors, and determining, presenting, and implementing aspects of risk unit based insurance policies, may be performed in a central insurance system server 350 rather than by the individual vehicle 310 or personal mobile device 330. In such implementations, the vehicle 310 and and/or mobile device 330, might only collect and transmit driver data, vehicle data, driving data, and the like to an insurance server 350, and thus the vehicle-based driving analysis computer 314 may be optional.

The system 300 also may include one or more insurance system servers 350, containing some or all of the hardware/software components as the computing device 101 depicted in FIG. 1. The insurance system server 350 may include hardware, software, and network components to receive driver data, vehicle data, and vehicle operational data/driving data from one or more vehicles 310, mobile devices 330, and other data sources. The insurance system server 350 may include an insurance database 352 and risk unit based insurance system 351 to respectively store and analyze driver data, vehicle data, and driving data, etc., received from vehicle 310, mobile device 330, and other data sources. In some examples, the risk unit based insurance system 351 may include many or all of the components of risk unit based insurance system 200 described with respect to FIG. 2.

The insurance system server 350 may initiate communication with and/or retrieve driver data, vehicle data, and driving data from vehicle 310 wirelessly via telematics device 313, mobile device 330, or by way of separate computing systems over one or more computer networks (e.g., the Internet). Additionally, the insurance system server 350 may receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the insurance database 352 may be organized in any of several different manners. For example, a driver table in database 352 may contain all of the driver data for drivers associated with the insurance provider (e.g., driver personal information, insurance account information, demographic information, accident histories, risk factors, driving scores and driving logs, etc.), a vehicle table may contain all of the vehicle data for vehicles associated with the insurance provider (e.g., vehicle identifiers, makes, models, years, accident histories, maintenance histories, travel logs, estimated repair costs and overall values, etc.), and a driving trip table may store all of the driving trip data for drivers and vehicles associated with the insurance provider (e.g., driving trip driver, vehicle driven, trip time, starting and ending points, route driven, etc.). Other tables in the database 352 may store additional data, including data types discussed above (e.g. traffic information, road-type and road condition information, weather data, insurance policy data, etc.). Additionally, one or more other databases of other insurance providers containing additional driver data and vehicle data may be accessed to retrieve such additional data.

The risk unit based insurance system 351 within the insurance system server 350 may be configured to retrieve data from the database 352, or may receive driver data, vehicle data, and driving trip directly from vehicle 310, mobile device 330, or other data sources, and may perform driving data analyses, determine insurance parameters for risk unit based insurance policies, and other related functions. The functions performed by the risk unit based insurance analysis system 351 may be performed by specialized hardware and/or software separate from the additional functionality of the insurance system server 350. Such functions may be similar to those of driving analysis module 314 of vehicle 310, and the driving analysis and risk unit based insurance applications 334 and 335 of mobile device 330, and further descriptions and examples of the algorithms, functions, and analyses that may be executed by the risk unit based insurance system 351 are described below, including in reference to FIGS. 4-9.

In various examples, the driving data and driving trip analyses and/or risk unit based insurance determinations may be performed entirely in the insurance system server 350, may be performed entirely in the vehicle-based driving analysis computing module 314, or may be performed entirely in the driving analysis and risk unit based insurance applications 334 and 335 of mobile device 330. In other examples, certain analyses of driver data, vehicle data, and driving trip data, and certain risk unit based insurance determinations may be performed by vehicle-based devices (e.g., within driving analysis module 314) or mobile device 330 (e.g., within applications 334 and 335), while other data analyses and risk unit based insurance determinations are performed by the risk unit based insurance system 351 at the insurance system server 350. For example, a vehicle-based driving analysis computer 314, or the hardware and software components of mobile device 330 may continuously receive and analyze driver data, vehicle data, driving trip data, and the like to determine certain events and characteristics (e.g., commencement of a driving trip, identification of a driver, determination of a driving route or intended destination, driving data and behaviors during driving trips, etc.), so that large amounts of data need not be transmitted to the insurance system server 350. However, for example, after driver, vehicle, and/or driving trip is determined by a vehicle-based device and/or mobile device, corresponding information may be transmitted to the insurance server 350 to perform insurance offer and cost determinations, determine consumption rate of risk units, generate one or more recommendations for reducing consumption rate, etc. which may be transmitted back to the vehicle-based device and/or personal mobile devices.

Figure 4:
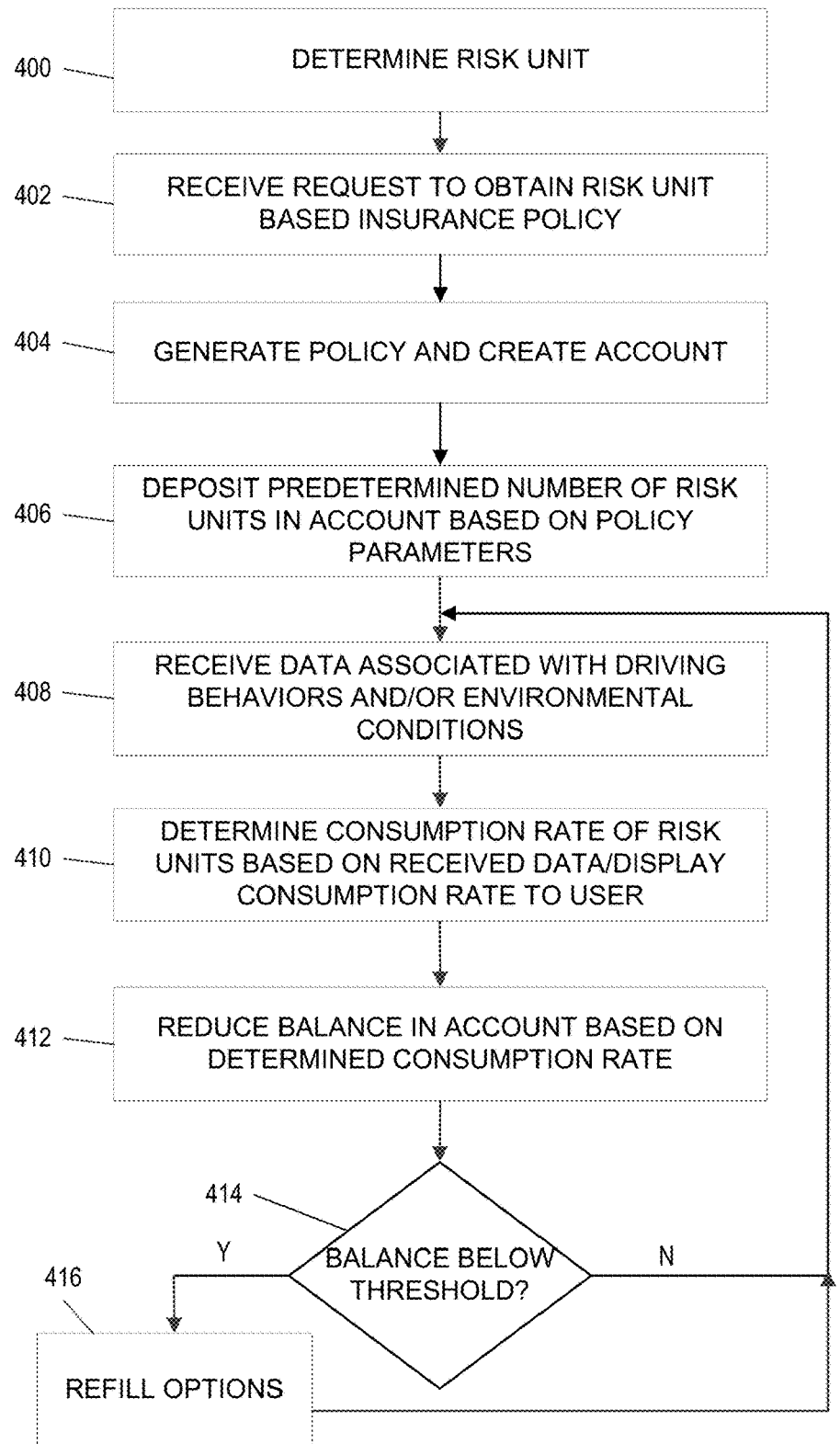
FIG. 4 is a flow diagram illustrating an example method of generating a risk unit based insurance policy and implementing the risk unit based insurance policy according to one or more aspects described herein.

FIG. 4 is a flow chart illustrating one example method of providing risk unit based insurance to a user, according to one or more aspects described herein. In step 400, a risk unit is determined. As discussed above, the risk unit may be a common insurance unit that represents a cost to insure an average user for a predetermined period of time. For instance, the risk unit may be determined to be the cost to insure an average user for one week, one month, one year, etc. The risk unit may be used to provide insurance such that users may obtain risk unit based insurance policies in which, as the user, for example, operates a vehicle, the number of risk units in a risk unit account account is reduced based on a consumption rate determined for the user, trip, etc. These and other aspects are discussed more fully herein.

In step 402, a request is received to obtain a risk unit based insurance policy. The request may be received from a user and may be received, in some examples, via a computing device (e.g., mobile device, or the like). The request may include information associated with the user, such as name, contact information, vehicle information including make, model, year, vehicle identification number, and the like. In some examples, the request to obtain the risk unit based insurance policy may include a level of coverage. For instance, similar to conventional insurance policies, a user may select from different levels of protection (e.g., whether to include collision coverage, amount of coverage for personal property, and the like). Similarly, a user may select a level of risk unit on which the policy is based. In one example, three levels may be used with the highest level of risk unit providing the most coverage and, in some instances, having the highest cost (e.g., cost per risk unit) to the user. A second level would provide lower coverage at a lower cost and the third level may provide a lowest level of coverage at a lowest cost. In another example, different levels of coverage selected may be reflected in the consumption rate of the units. For instance, the consumption rate may vary based on a level of coverage selected. Although different levels of coverage may be available to a user, the levels offered may meet minimum standards for insurance coverage, such as those required by the state in which the user lives, or the like.

Further, although three levels of risk units are described in the above example, more or fewer levels of risk unit, and, accordingly, insurance coverage, may be provided without departing from the invention.

In step 404, a risk unit based insurance policy is generated for the user and a risk unit account is created for the user. The risk unit account may be associated with the user or the vehicle. That is, the risk unit based insurance policy may provide coverage for the vehicle, regardless of which user is operating the vehicle, or may provide coverage to any vehicle being operated by a particular user. Thus, in some examples, the user or operator of a vehicle may be identified (e.g., upon initiation of vehicle operation) in order to determine whether or what type of coverage to provide.

In step 406, a predetermined number of risk units is deposited into the account created. The predetermined number or risk units may be based on one or more policy parameters (e.g., term or length of policy), and/or one or more user preferences.

In step 408, data associated with the driving behaviors of the user and/or environmental conditions in which the vehicle is operating are received. As discussed above, the data may be received from one or more sensors associated with the vehicle, as well as various other sources, such as traffic, weather, road condition, etc. sources. As discussed herein, received data may include speed, braking habits of the user or operator, type of road(s) being travelled, time of day, level of traffic, precipitation, and the like.

Based on the data received, a consumption rate of risk units in the risk unit account may be determined in step 410. As discussed herein, the consumption rate may be higher based on various behaviors and/or conditions that are determined to include more risk to the user, vehicle, etc. For instance, if a user is driving at a rate of speed above the speed limit, the consumption rate may be higher than if the user was operating at a speed closer to the speed limit. In another example, the consumption rate may be determined to be lower if the user travels outside of rush hour, rather than during peak travel times. In still another example, the consumption rate may increase if data is received that it is raining or snowing on the route which the vehicle is travelling. As discussed above, consumption rate may also be based, at least in part, on traditional policy factors, such as driving experience, driving record, credit factors, coverages, deductibles, and the like. Data related to various behaviors and conditions and/or traditional policy data, may be combined to determine the consumption level in real-time or near real-time, as the user is operating the vehicle. Accordingly, the system may provide information associated with the consumption rate to the user. For instance, the vehicle display or mobile device of the user may display the current consumption rate. In another example, the display may include historical information associated with consumption rate for previous trips and/or a graphical display of previous and/or current consumption rates.

FIG. 5 illustrates one example user interface 500 that may be provide to a user (e.g., via a vehicle display, mobile device, or other computing device) to provide information associated with the consumption rate. The interface 500 includes fields 502 and 504 in which the vehicle and operator of the vehicle are identified, respectively. Field 506 indicates a date and time of the current trip. In some examples, an elapsed time of the current trip may also be displayed.

Field 508 indicates that data is being received. As discussed herein, data associated with one or more sensors detecting driving behaviors of the user, environmental conditions, and the like, may be received by the system and used to determine a current consumption rate. Field 508 provides an indication that data is currently being received. In the event of a communication disruption, field 508 may indicate that data is not being received or that an error has occurred. In some example situations of that nature, the system may apply the most recently determined consumption rate until data communication is restored and more current data is received by the system.

Field 510 provides the current calculated or determined consumption rate. As described herein, the consumption rate may be based on a variety of factors that may include driving behaviors, environmental conditions, and the like, as determined based on data received by the system. Field 512 provides a listing of historical consumption rate information that may be useful to the user in tracking consumption rate.

With further reference to FIG. 4, in step 412, a balance of risk units in the risk unit account is reduced based on the consumption rate determined in step 410. As the balance in the risk unit account is reduced, the account may include a predetermined threshold below which the user may be notified that the balance of risk units is low or in need of replenishment. For instance, in step 414, a determination is made as to whether a balance of risk units in the risk unit account is below a predetermined threshold. The predetermined threshold may be based on one or more policy parameters, may meet a government or other regulatory body standards, or may be determined by the user or insurance provider. In some examples, the threshold may be a percentage of a number of risk units obtained with the policy (e.g., a percentage of the full account balance). For instance, the threshold may be 10%, 15% or any other percentage of the full number of risk units obtained with the policy. In other examples, the threshold may be a number of risk units. For instance, the threshold may be 50, 100, or any other number of risk units.

If, in step 414, the balance in the risk unit account is at or above the predetermined threshold, the process may return to step 408 to continue receiving data and determining consumption rate. If, in step 414, the balance is below the predetermined threshold, one or more refill options may be provided to the user in step 416. Refill options may include providing a notification to the user of the current balance and/or providing options for automatic refill, user requested refill, cancellation of policy, purchase of a new policy and associated risk units, and the like. Once the refill options are presented, the system may return to step 408 to continue receiving data, etc.

Figure 6:
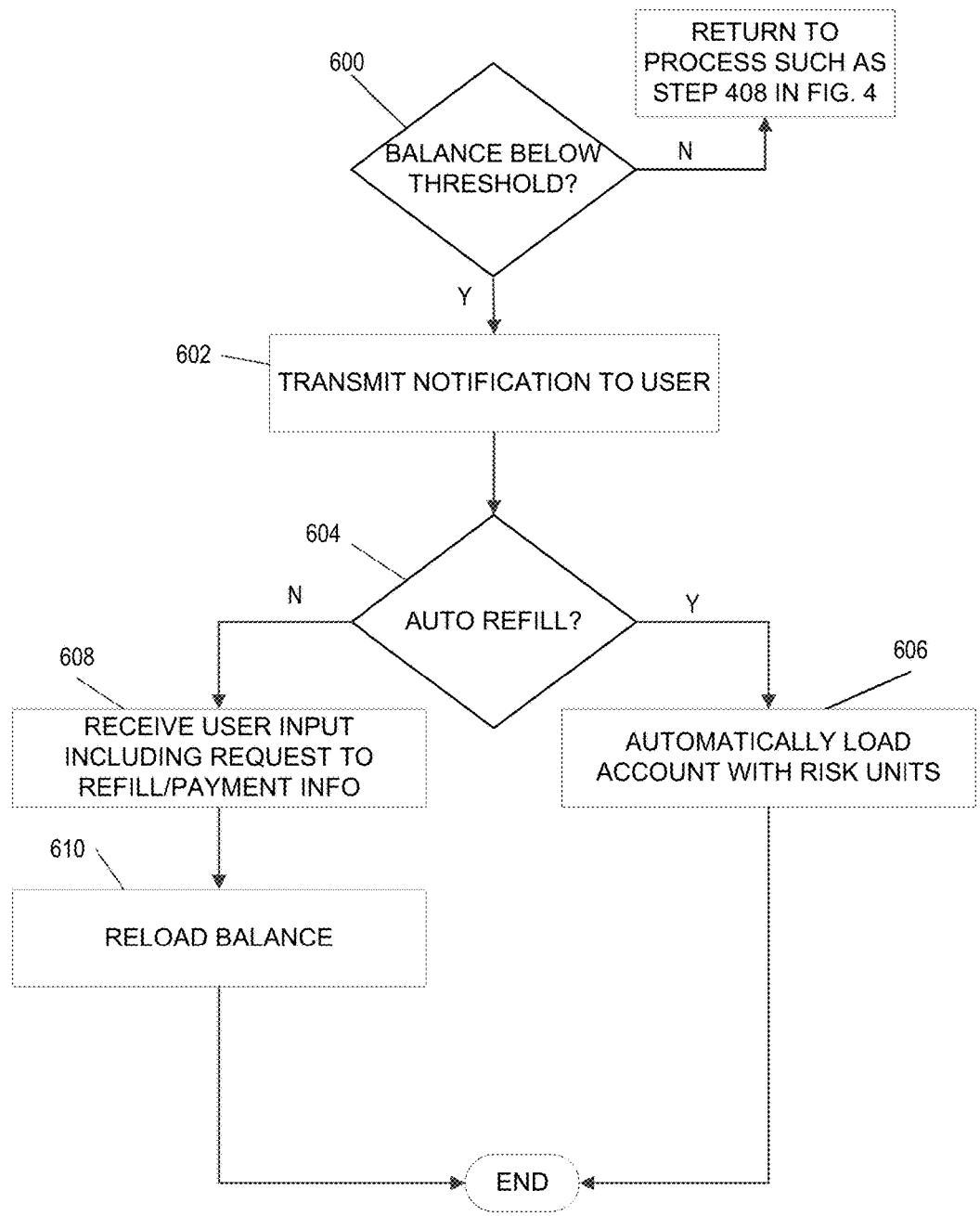
FIG. 6 is a flow diagram illustrating an example method of providing one or more risk unit account refill options to a user, according to one or more aspects described herein.

FIG. 6 illustrates an example method of refilling risk units according to one or more aspects described herein. In step 600, similar to step 414 in FIG. 4, a determination is made as to whether a balance of risk units in a risk unit account is below a predetermined threshold. If not, the system may return to processes in which data is received, consumption rate is determined, etc., such as step 408 in FIG. 4. If, in step 600, the balance is below the threshold, a notification is transmitted to the user in step 602. The notification may include an indication that the risk unit account is below the threshold and/or may provide instructions for refill of the account.

In step 604, a determination is made as to whether the account is set up for automatic refill. That is, the system may determine whether the user has preselected an option to automatically refill a balance in the account (e.g., by automatically purchasing additional risk units using pre-stored payment information). If so, the system may automatically purchase the predetermined number of units, charge any cost to the pre-stored payment information (e.g. credit card information, account information, debit card information, etc.), and deposit the risk units purchased in the account in step 606.

If, in step 604, it is determined that the account is not set for automatic refill, in step 608, the user may respond to the notification transmitted in step 602 with a request to refill the account balance. The request may include a number of units to purchase, payment information, risk unit account information, policy information, and the like. In step 610, the designated number of risk units may be purchased and deposited in the risk unit account.

FIGS. 7A-7D illustrate example user interfaces 700a-700d that may be used to carry out refill or replenishment of risk units in a risk unit account. Although interfaces 700a-700d are shown in FIGS. 7A-7D as being displayed on a mobile device, the interfaces provided may be displayed on various different types of computing devices, including, for instance, a vehicle display, laptop or desktop computing device, tablet computing device, and the like.

Figure 7A:
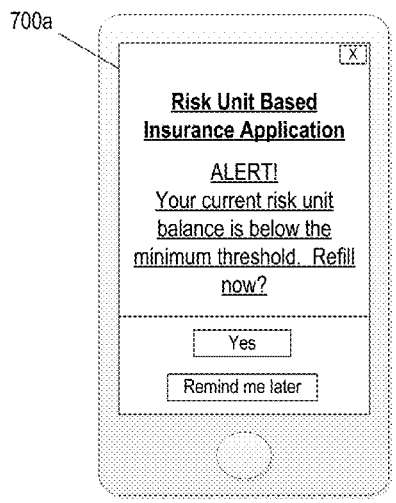
FIGS. 7A-7D are example user interfaces that may be provided to a user to facilitate risk unit account replenishment according to one or more aspects described herein.

FIG. 7A illustrates interface 700a in which a notification is provided to the user. The notification 700a indicates that the risk unit account is below the minimum threshold and provides options for the user to proceed with refilling the account balance now or requesting that the system remind the user later. Selection of the option to remind the user later may automatically prompt the notification to be displayed again at a predetermined time (e.g., each day, each hour, 48 hours from selection of remind me later option, etc.) or upon any continued consumption of the risk units. Accordingly, as the balance in the risk unit account continues to be reduced, additional notifications may be provided to the user. In some examples, determination of the balance being below a predetermined level (e.g., below the level for refill notification) may result in various actions being taken with respect to the vehicle. For instance, the system may cause the headlights to flash or horn to blare while driving, may prevent the vehicle from starting if there is an insufficient number of risk units in the account, or the like.

Figure 7B:
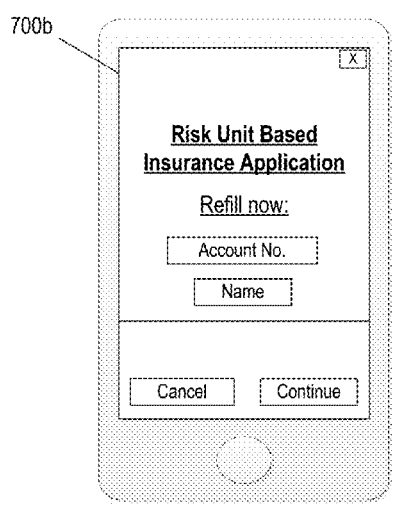
Figure 7C:
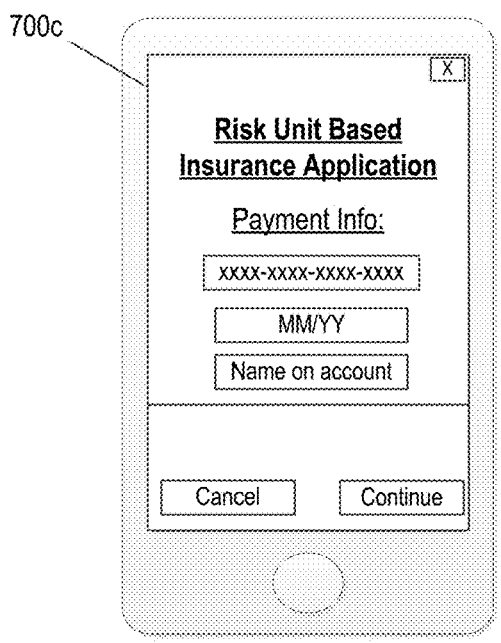

Upon selection of yes option in 700a, interface 700b shown in FIG. 7B, or similar interface, may be displayed in which the user may input one or more risk unit account details, such as an account number and/or name associated with the account. In some examples, this information may automatically be prefilled based on the mobile device being associated with the user, vehicle, and/or account. The user may select continue option to prompt display of interface 700c in FIG. 7C, or similar interface, which provides fields in which the user may enter payment information. Information such as a credit card number, expiration date, name on the card, and the like, may be provided by the user. Although credit card information is provided as example payment information in FIG. 7C, various other payment types may be used, such as electronic funds transfer, debit card, pre-paid debit or credit card, gift card, or the like.

Figure 7D:
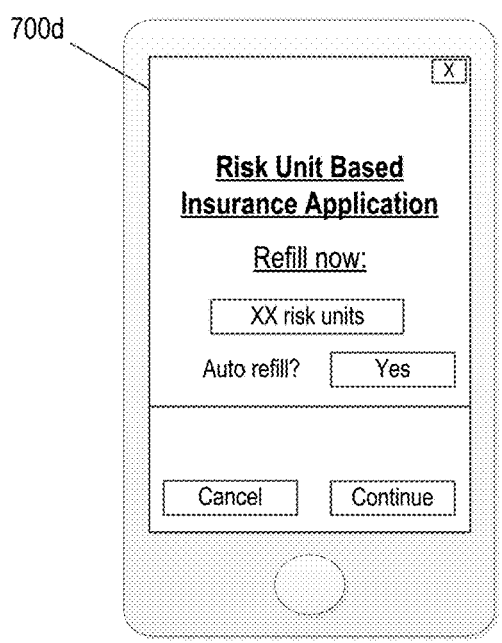

Upon selection of continue option, interface 700d in FIG. 7D, or similar interface, may be provided to the user. Interface 700d includes a field in which the user may indicate a number of risk units to purchase. In some examples, the risk units may be a predetermined number of units based on one or more policy parameters. In other examples, the number of units available for purchase may be determined by the user and input into interface 700d.

User interface 700d further includes an option to select automatic refill. Indication of "yes" to automatic refill prompts the system to store the payment information provided in interface 700c and, upon the system determining that the balance of risk units is below the predetermined threshold (e.g., step 414 in FIG. 4, step 600 in FIG. 6) the system may automatically purchase the predetermined number of risk units, charge the associated cost to the pre-stored payment information, and deposit the purchased risk units in the risk unit account, thereby effectively automatically renewing insurance for the user.

Figure 8:
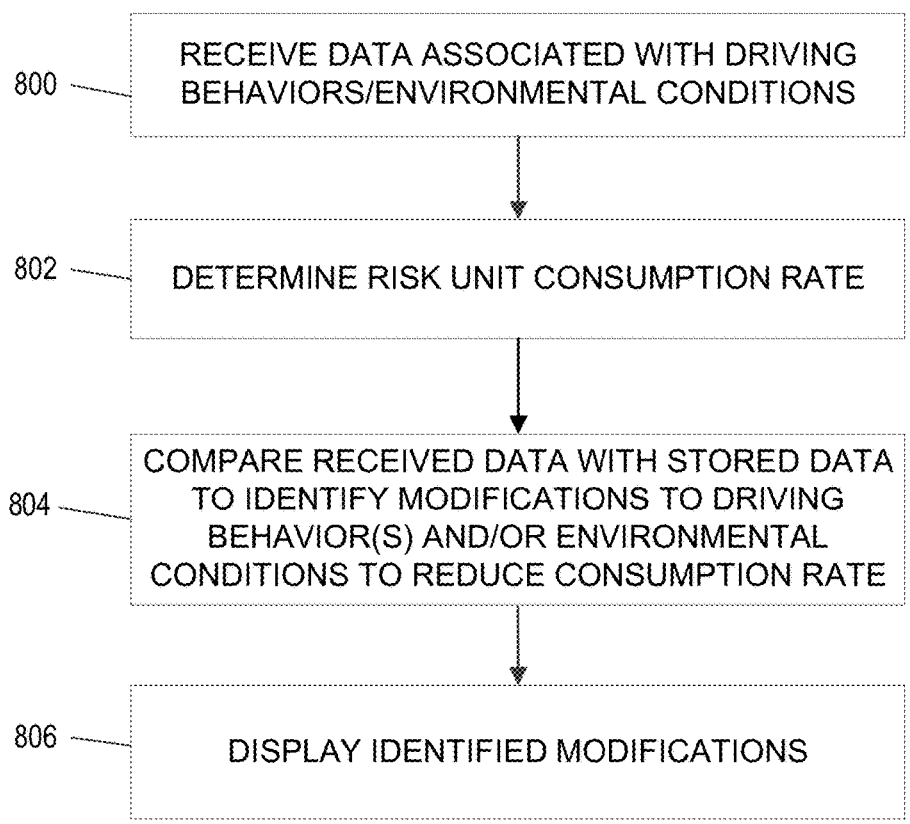
FIG. 8 is a flow diagram illustrating an example method of generating suggested modifications to driving behaviors in order to improve risk unit consumption rate, according to one or more aspects described herein.

FIG. 8 illustrates one example method of determining proposed recommendations for reducing risk unit consumption rate according to one or more aspects described herein. In step 800, data associated with driving behaviors of the user and/or environmental conditions may be received. As discussed above, data may include speed, braking habits, level of precipitation, road conditions, time of day, traffic level, and the like. Based on the received data, a risk unit consumption rate may be determined in step 802. In some examples, the risk unit consumption rate may also be based on one or more factors associated with the user. For instance, accident history, length of time as licensed driver, credit rating, policy limits, policy deductibles, vehicle features, and the like, may, in some examples, be used in determining a risk unit consumption rate.

In step 804, one or more driving behavior or environmental condition modifications may be identified that may aid in reducing the risk unit consumption rate. For instance, if a user is driving on a road that is known as being in poor condition (e.g., potholes, poor lane markings, etc.), the system may indicate that, by changing the route to the destination, the user may reduce his or her consumption rate. In some examples, a recommended modification identified to aid in reducing risk unit consumption rate may include modifications to more traditional policy factors, such as policy coverage, deductibles and/or limits, vehicle operation and/or maintenance, vehicle features, and the like.

In some examples, the modifications to reduce consumption rate may be identified by comparing received data with a database storing known conditions, behaviors, roads, environmental factors, and the like, that are associated with a reduced consumption rate. The database may store information such as historical travel information, accident history information, accident probability information, etc. that may be collected based on insurance data received by the insurance provider. For instance, the data associated with current speed may be compared to a posted speed limit for the current road (as stored in the database or received from an outside source) and, if the current speed is higher than the posted speed limit, a modification to slow the speed of the vehicle in order to reduce consumption rate may be identified.

In another example, the received data may indicate that the current road is congested or is experiencing heavy traffic. The system may compare the current traffic information to levels of traffic that would result in a reduced consumption rate and may recommend modifying the route being travelled. In some examples, the suggested modification may include a suggested alternate route.

Various other driving behavior and/or environmental condition modifications may be identified based on the received data and/or historical data, stored data, and the like. The examples described herein are merely some examples and are not intended to limit the modifications or types of modifications identified by the system. Rather, various other modifications may be identified without departing from the invention.

In step 806, the identified modifications may be display to the user. For instance, one or more of the recommended modifications to reduce consumption rate may be displayed to the user via a computing device, such as a mobile device, vehicle display, or the like.

Figure 9:
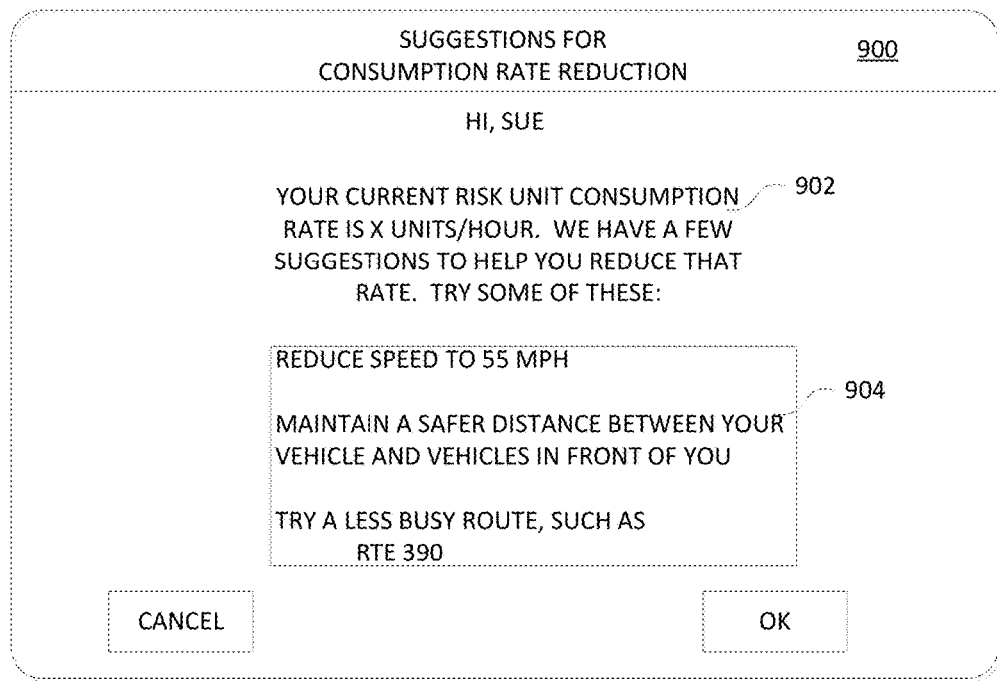
FIG. 9 is an example user interface providing one or more recommended driving behavior modifications to a user, according to one or more aspects described herein.

FIG. 9 illustrates one example user interface 900 displaying recommended modifications for reducing consumption rate according to one or more aspects described herein. The interface includes region 902 in which the current risk unit consumption is provided to the user. The interface 900 further includes region 904 in which one or more suggested driving modifications are provided to the user. As data is received by the system from one or more vehicle sensors, the risk unit consumption rate may change and the revised consumption rate may then be displayed. In some examples, audio may accompany the notification. For instance, the notification may include an audio portion in which the text of the notification is stated to the user, thereby reducing the user's need to read the notification.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A risk unit based system, comprising:
   an insurance system server including one or more processors, and at least one memory storing computer-readable instructions that, when executed by the one or more processors, cause the insurance system server to:
   determine a number of risk units in a risk unit account associated with an insurance policy of a vehicle, each risk unit representing a cost to insure an average user for a predetermined period of time;
   receive, from at least one sensor arranged on the vehicle, first driving data associated with at least one of: a user of the vehicle, and an environment in which the vehicle is being operated, at a first time;
   analyze, in real-time, the received first driving data to determine a first consumption rate of the risk units;
   reduce, in real-time, a number of risk units in the risk unit account based on operation of the vehicle, wherein a rate at which the number of risk units is reduced is the determined first consumption rate;
   determine whether a balance of risk units in the risk unit account is below a predetermined threshold;
   responsive to determining that the balance of risk units in the risk unit account is below the predetermined threshold, automatically adding additional risk units to the balance of risk units in the risk unit account; and
   responsive to determining that the balance of risk units is at or above the predetermined threshold:
   receive, from the at least one sensor arranged on the vehicle, second driving data associated with at least one of: the user of the vehicle, and the environment in which the vehicle is being operated at a second time;
   analyze, in real-time, the received second driving data to determine a second consumption rate of the risk units; and
   reduce, in real-time, a number of risk units in the risk unit account based on operation of the vehicle, wherein a rate at which the number of risk units is reduced is the determined second consumption rate.

2. The risk unit based system of claim 1, wherein automatically adding additional risk units to the balance of risk units in the risk unit account further includes:
   prior to determining that the balance of risk units in the risk unit account is below the predetermined threshold, receiving user input from the user selecting a number of risk units to automatically add to the balance of risk units in the risk unit account when it is determined that the balance is below the predetermined threshold.

3. The risk unit based system of claim 1, wherein automatically adding additional risk units to the balance of risk units in the risk unit account further includes:
   prior to determining that the balance of risk units in the risk unit account is below the predetermined threshold, receiving user input from the user indicating payment information to be used to pay for a cost of the additional risk units being added.

4. The risk unit based system of claim 3, wherein the payment information includes at least one of: checking account information, debit card information, credit card information.

5. The risk unit based system of claim 1, wherein the first consumption rate is at the first time and the second consumption rate is at the second time.

6. The risk unit based system of claim 5, wherein the second time is subsequent to the first time.

7. The risk unit based system of claim 1, further including instructions that, when executed, cause the insurance system server to:
   responsive to determining that the balance of risk units is below the predetermined threshold, provide a notification to the user that the balance of risk units in the risk unit account is below the predetermined threshold.

8. The risk unit based system of claim 7, wherein the notification is provided to the user via a mobile device of the user.

9. The risk unit based system of claim 7, wherein the notification is provided to the user via a vehicle display associated with an on-board vehicle computing device.

10. A risk unit based system, comprising:
an on-board vehicle computing device including at least one processor and at least one memory storing computer readable instructions that, when executed by the at least one processor, cause the on-board vehicle computing device to:
receive, from at least one sensor arranged in a vehicle, first driving data associated with at least one of: a user of the vehicle and an environment in which the vehicle is being operated at a first time;
transmit, to an insurance system server, the received first driving data;
the insurance system server including one or more processors, and at least one memory storing computer-readable instructions that, when executed by the one or more processors, cause the insurance system server to:
receive the first driving data;
determine a number of risk units in a risk unit account associated with an insurance policy of a vehicle, each risk unit representing a cost to insure an average user for a predetermined period of time;
analyze, in real-time, the received first driving data to determine a first consumption rate of the risk units;
reduce, in real-time, a number of risk units in the risk unit account based on operation of the vehicle, wherein a rate at which the number of risk units is reduced is the determined first consumption rate;
determine whether a balance of risk units in the risk unit account is below a predetermined threshold;
responsive to determining that the balance of risk units in the risk unit account is below the predetermined threshold, automatically adding additional risk units to the balance of risk units in the risk unit account; and
responsive to determining that the balance of risk units is at or above the predetermined threshold, the on-board vehicle computing device further including computer readable instructions that, when executed by the at least one processor, cause the on-board vehicle computing device to:
receive, from the at least one sensor arranged on the vehicle, second driving data associated with at least one of: the user of the vehicle, and the environment in which the vehicle is being operated at a second time;
transmit, to the insurance system server, the received second driving data;
the insurance system server further including computer-readable instructions that, when executed by the one or more processors, cause the insurance system server to:
receive the second driving data;
analyze, in real-time, the received second driving data to determine a second consumption rate of the risk units; and
reduce, in real-time, a number of risk units in the risk unit account based on operation of the vehicle, wherein a rate at which the number of risk units is reduced is the determined second consumption rate.

11. The risk unit based system of claim 10, wherein automatically adding additional risk units to the balance of risk units in the risk unit account further includes:
prior to determining that the balance of risk units in the risk unit account is below the predetermined threshold, receiving user input from the user selecting a number of risk units to automatically add to the balance of risk units in the risk unit account when it is determined that the balance is below the predetermined threshold.

12. The risk unit based system of claim 10, wherein automatically adding additional risk units to the balance of risk units in the risk unit account further includes:
prior to determining that the balance of risk units in the risk unit account is below the predetermined threshold, receiving user input from the user indicating payment information to be used to pay for a cost of the additional risk units being added.

13. The risk unit based system of claim 12, wherein the payment information includes at least one of: checking account information, debit card information, credit card information.

14. The risk unit based system of claim 10, wherein the first consumption rate is at the first time and the second consumption rate is at the second time.

15. The risk unit based system of claim 14, wherein the second time is subsequent to the first time.

16. The risk unit based system of claim 10, further including instructions that, when executed, cause the insurance system server to:
responsive to determining that the balance of risk units is below the predetermined threshold, provide a notification to the user that the balance of risk units in the risk unit account is below the predetermined threshold.

17. The risk unit based system of claim 16, wherein the notification is provided to the user via a mobile device of the user.

18. The risk unit based system of claim 17, wherein the notification is provided to the user via a vehicle display associated with an on-board vehicle computing device.

19. One or more non-transitory computer-readable media storing computer executable instructions that, when executed by at least one computing device, cause the computing device to:
determine a number of risk units in a risk unit account associated with an insurance policy of a vehicle, each risk unit representing a cost to insure an average user for a predetermined period of time;
receive, from at least one sensor arranged on the vehicle, first driving data associated with at least one of: a user of the vehicle, and an environment in which the vehicle is being operated, at a first time;
analyze, in real-time, the received first driving data to determine a first consumption rate of the risk units;
reduce, in real-time, a number of risk units in the risk unit account based on operation of the vehicle, wherein a rate at which the number of risk units is reduced is the determined first consumption rate;
determine whether a balance of risk units in the risk unit account is below a predetermined threshold;
responsive to determining that the balance of risk units in the risk unit account is below the predetermined threshold, automatically adding additional risk units to the balance of risk units in the risk unit account; and responsive to determining that the balance of risk units is at or above the predetermined threshold:
  receive, from the at least one sensor arranged on the vehicle, second driving data associated with at least one of: the user of the vehicle, and the environment in which the vehicle is being operated at a second time;
  analyze, in real-time, the received second driving data to determine a second consumption rate of the risk units; and
  reduce, in real-time, a number of risk units in the risk unit account based on operation of the vehicle, wherein a rate at which the number of risk units is reduced is the determined second consumption rate.

20. The one or more non-transitory computer-readable media of claim 19, wherein automatically adding additional risk units to the balance of risk units in the risk unit account further includes:
  prior to determining that the balance of risk units in the risk unit account is below the predetermined threshold, receiving user input from the user selecting a number of risk units to automatically add to the balance of risk units in the risk unit account when it is determined that the balance is below the predetermined threshold.

* * * * *

UNITED STATES PATENT AND TRADEMARK OFFICE
CERTIFICATE OF CORRECTION

PATENT NO. : 10,475,128 B2
APPLICATION NO. : 15/170000
DATED : November 12, 2019
INVENTOR(S) : Biemer et al.

Page 1 of 1

It is certified that error appears in the above-identified patent and that said Letters Patent is hereby corrected as shown below:

On the Title Page

Page 3, Column 2, Other Publications, Line 15:
Delete "May 29, 2013" and insert --May 23, 2019--

In the Specification

Column 13, Detailed Description, Line 66:
Delete "321," and insert --332,--

Column 14, Detailed Description, Line 10:
Delete "321" and insert --332--

Column 17, Detailed Description, Line 10:
Delete "account account" and insert --account--

Signed and Sealed this
Eighth Day of December, 2020

Andrei Iancu
*Director of the United States Patent and Trademark Office*